Patented July 6, 1948

2,444,881

UNITED STATES PATENT OFFICE 2,444,881

PRESERVATION OF 1,3-DIENE COPOLYMERS WITH MONO-SUBSTITUTED THIOUREAS

Robert R. Sterrett, Totowa, N. J., assignor to United States Rubber Company, New York, N. Y., a corporation of New Jersey No Drawing. Application December 1, 1944, Serial No. 566,240

8 Claims. (Cl. 260—84.5)

This invention relates to the preservation of synthetic rubber-like (elastomeric) materials which are denoted broadly as diene polymers (including copolymers), and more particularly those derived from the modified 1,3-diene polymers which are formed from the polymerization of conjugated dienes with compounds of the structure

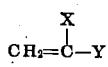

where X is hydrogen or methyl; and Y is CN, phenyl or methyl which includes especially those butadienoid polymers known to the trade as Buna S (GRS), Buna N (GRN), butyl (GRI), Chemigum, Hycar OR, etc.

An object of the invention is to provide chemicals which will preserve said synthetic rubber-like materials, and particularly those derived from 1,3-dienes, against deterioration during processing, prior to cure, where induced by oxygen, heat, or light. A further object is to provide a class of compounds which may be added to white or light-colored synthetic rubber stocks without producing bad discoloration when the compositions containing them are exposed to the action of sunlight. A still further object is to provide chemicals which protect the unvulcanized diene-vinyl compound copolymers against the deleterious effects of heat when such polymers are subjected to elevated temperatures during processing. Another object is to provide chemicals which have special and outstanding properties in connection with the preservation of diene-vinyl compound copolymes. Still other objects will be apparent from the following description.

I have found that these objects may be attained if there is incorporated into the synthetic rubber a mono-substituted thiourea of the formula

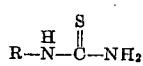

in which R is an organic radical selected from the group consisting of alkyl, aryl, aralkyl, alkenyl, cycloalkyl, and monovalent heterocyclic radicals.

Exemplary of such chemicals are phenyl thiourea, allyl thiourea, o-tolyl thiourea, m-tolyl thiourea, p-tolyl thiourea, alpha naphthyl thiourea, methyl thiourea, ethyl thiourea, butyl thiourea, lauryl thiourea, cyclohexyl thiourea, pyridyl thiourea, thiazyl thiourea.

These chemicals may be made by any of the methods known to the art.

The various synthetic elastomers are known by the art to be produced in various manners, including those shown in U. S. Patents Nos. 1,973,000 and 1,938,731, and British Patent No. 523,248; also U. S. Patent No. 2,332,194 (page 1, col. 2, lines 30-42) and U. S. Patent No. 2,356,128. The present invention, however, is not concerned with the particulars of producing these elastomers but in their preservation, as aforesaid.

For the purpose of illustrating the best modes of the invention, examples of a 1,3-butadiene-styrene copolymer (GRS) containing mono-substituted thioureas are given for showing the beneficial effects to be obtained from the use of such chemicals.

Example 1

In order to test the value of the chemicals of the invention as preservatives for uncompounded diene-vinyl compound copolymers, the following mixes were made. The indicated amounts represent parts by weight.

|  | A | B | C |
|---|---|---|---|
| Unstabilized butadiene-styrene copolymer | 100.0 | 100.0 | 100.0 |
| Phenylthiourea |  | 2.0 |  |
| Allylthiourea |  |  | 2.0 |

Stocks A, B, and C were placed in an oven at 212° F. for 24 hours and were then examined. The surface of stock A had become resinified and cracked, whereas stocks B and C were still in good condition and showed no evidence of deterioration. All samples were replaced in the oven and heated at 212° F. for a further 24 hours. The deterioration of stock A had progressed to a greater extent than was observed in the previous examination, the surface beginning to harden and to break readily on bending. Stocks B and C were still in good condition, the surfaces remaining soft and unchanged.

Example 2

A white synthetic rubber composition containing by weight 100 parts of unstabilized butadiene-styrene copolymer, 10 parts of zinc oxide, 60 parts of lithopone, 5 parts of paraffin oil, 2 parts of sulfur, 60 parts of whiting and 2 parts of mercaptobenzothiazole was divided into three parts (stocks D, E, and F). Stock E has added to it 2 parts of phenyl thiourea per 100 parts of copolymer, and stock F has added to it 2 parts of allyl thiourea per 100 parts of copolymer. No antioxidant was added to stock D. The three mixes were mold-cured for 90 minutes at 45 pounds steam pressure. The samples of the resulting stocks were exposed to the action of sunlight under a glass cover for 5 days. The stocks showed little or no discoloration after this treatment. Thus it is shown that these deterioration inhibitors are suitable for use in either white or light colored stocks.

It can be seen from these results that the compounds of this invention are extremely effective in overcoming the deterioration of diene-vinyl compound copolymers due to heat and oxidation. Furthermore, these results show that these deterioration inhibitors are practically non-discoloring to white or light colored stocks and are thereby suitable for use in either white or light colored synthetic rubber articles although they may be used in any color and type of rubber article.

The deterioration inhibitors of this invention may be used alone in the synthetic rubber composition or may be mixed with other preservatives, fillers, accelerators, vulcanizing agents, or compounding agents of any sort known to the art. The components of the synthetic rubber composition may be used in various ratios and it is not intended to limit the invention to the amounts of ingredients indicated in the examples given.

The age resistors of the invention may be incorporated into the synthetic rubber by milling or similar process, or by mixing with the synthetic rubber latex before coagulation, or application thereof may be made to the surface of the crude polymer or of the vulcanized product. The amount of the age resistor may vary, economical proportions ranging from 0.25 part to 5.0 parts by weight, based on 100 parts by weight of the elastomer base.

Synthetic rubber goods of various descriptions may have their useful life prolonged by the practice of this invention including tubes, hose, wire, insulation, boots and shoes, surgical instruments, drug sundries, dipped synthetic rubber articles, vehicle tires, etc.

Having thus described my invention, what I claim and desire to protect by Letters Patent is:

1. A method of preserving an elastomeric polymerization product of 1,3-butadiene with a compound of the structure

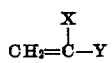

where X is a radical selected from the class consisting of hydrogen and methyl; and Y is a radical selected from the class consisting of CN, phenyl and methyl, which comprises incorporating therein a compound having the general formula

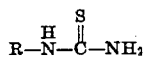

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

2. A method of preserving an elastomeric 1,3-butadiene-styrene copolymer which comprises incorporating therein a compound having the general formula

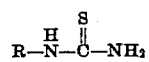

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

3. A method of preserving an elastomeric 1,3-butadiene-acrylonitrile copolymer which comprises incorporating therein a compound having the general formula

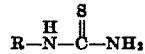

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

4. An elastomeric polymerization product of 1,3-butadiene with a compound of the structure

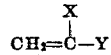

where X is a radical selected from the class consisting of hydrogen and methyl; and Y is a radical selected from the class consisting of CN, phenyl and methyl, in admixture with a compound having the general formula

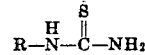

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

5. An elastomeric polymerization product of 1,3-butadiene-styrene copolymer in admixture with a compound having the general formula

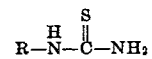

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

6. An elastomeric polymerization product of 1,3-butadiene-acrylonitrile copolymer in admixture with a compound having the general formula

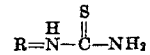

in which R is an organic radical selected from the group consisting of alkyl, aryl, aralkyl, alkenyl, cycloalkyl, and monovalent heterocyclic radicals, said latter compound being in a small but sufficient amount to preserve the said elastomeric copolymer.

7. A method of preserving an elastomeric 1,3-butadiene-styrene copolymer which comprises incorporating therein phenyl thiourea, said latter compound being in a small but sufficient amount to preserve the said elastomeric copolymer.

8. A method of preserving an elastomeric 1,3-butadiene-styrene copolymer which comprises incorporating therein allyl thiourea, said latter compound being in a small but sufficient amount to preserve the said elastomeric copolymer.

ROBERT R. STERRETT.

REFERENCES CITED

The following references are of record in the file of this patent:

UNITED STATES PATENTS

| Number | Name | Date |
| --- | --- | --- |
| 2,365,400 | Fikentscher | Dec. 19, 1944 |